(No Model.)
J. D. HOUSTON.
AUTOMATIC DRINKING FOUNTAIN.
No. 437,031.  Patented Sept. 23, 1890.
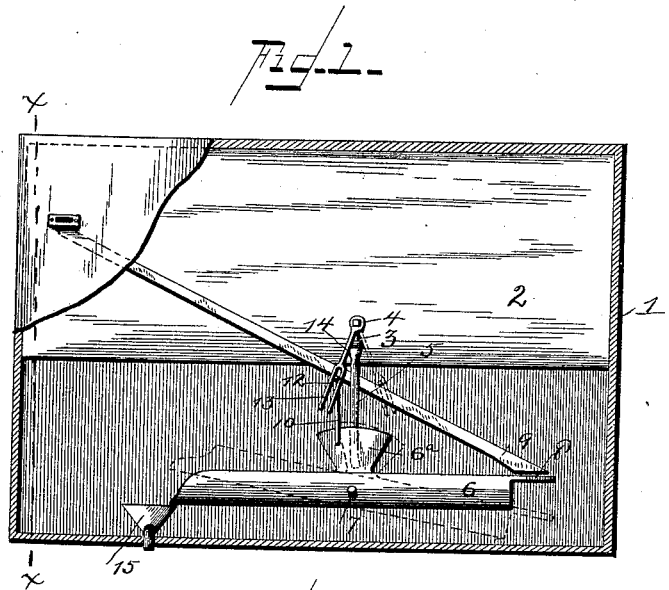
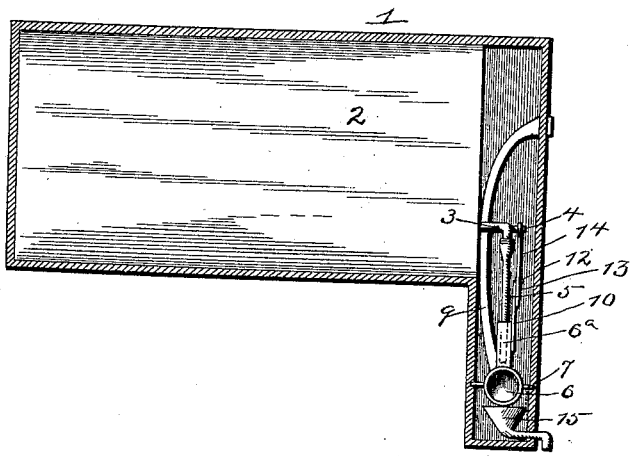
WITNESSES:  INVENTOR:

UNITED STATES PATENT OFFICE.

JAMES D. HOUSTON, OF MINERVA, OHIO.

AUTOMATIC DRINKING-FOUNTAIN.

SPECIFICATION forming part of Letters Patent No. 437,031, dated September 23, 1890.

Application filed June 17, 1890. Serial No. 355,701. (No model.)

*To all whom it may concern:*

Be it known that I, JAMES D. HOUSTON, a citizen of the United States, and a resident of Minerva, in the county of Stark and State of Ohio, have invented certain new and useful Improvements in Automatic Drinking-Fountains; and I do hereby declare that the following is a full, clear, and exact description of the invention, which will enable others skilled in the art to which it appertains to make and use the same, reference being had to the accompanying drawings, which form a part of this specification.

My invention relates to improvements in automatic drinking-fountains of that class in which the introduction of a coin causes a predetermined quantity of liquid to be discharged.

The object of the invention is to provide a device for automatically vending lemonade, mineral water, and other similar beverages, which shall be simple and economical in construction, whereby the service of an attendant may be dispensed with.

The invention consists in the novel construction and combination of parts, hereinafter fully described, and specifically pointed out in the claims.

In the accompanying drawings, Figure 1 represents an elevation of an apparatus constructed in accordance with my invention, one of the sides of the inclosing-casing being removed. Fig. 2 is a cross-section on the line $x$ $x$, Fig. 1.

In the said drawings, the reference-numeral 1 designates a vessel or casing containing a receptacle 2 for the beverages to be dispensed. In the lower side of this receptacle 2 is a cock or faucet 3, having a handle 4. It is also provided with a flexible pipe or tube 5, connected at one end with the discharge-opening thereof.

In the lower part of the vessel or casing 1 is a pivoted tube 6, which has its bearings in the frame 7, and is open at one end and closed at the other. This tube is evenly balanced, and at its closed end it is provided with a plate 8 to receive a coin from the spout 9. This spout extends upwardly to near the top of the casing, where there is a slit for the insertion of a coin, and it terminates immediately above the plate 8, so that a coin inserted in the slit will pass down the spout and fall upon the plate. In the upper side of the tube 6 is a fan-shaped funnel $6^a$, communicating therewith and connected with the lower end of the flexible pipe 5. This funnel is also provided with an arm 10, projecting upwardly therefrom and bent over at a right angle, forming a short arm 12, which engages with the bifurcated arm 13 of a rod or bar 14, which is connected with the handle 4 of the cock 3. The numeral 15 designates a delivery-spout located at the open end of the tube 6 and projecting outside the casing.

The operation is as follows: When a purchaser desires a glass of the beverage contained in the tank or receptacle 2 he places a coin (usually a nickel) in the slit in the casing, which rolls down the spout 9 and falls upon the plate 8. This overbalances the tube 6, causing its closed end to be depressed and the arms 10 on the funnel to be moved, which will open the cock 3 and allow the liquid contained in the tank to flow into the tube through pipe 5 and funnel $6^a$. When the proper quantity of liquid has entered the tube 6, it will overbalance the same and cause its open end to be depressed and the liquid to be discharged through outlet 15 into a glass or other vessel. As soon as the closed end of the tube 6 is depressed the coin at once slides or falls off into a receptacle arranged for it. The parts will remain in normal position when the liquid shall have been discharged from said tube.

From the above it will be seen that the services of an attendant may be dispensed with in vending liquids of the character described. It also is a check against surreptitious withdrawal of the liquid, as it is impossible to withdraw any therefrom without inserting a coin equal in value in the slit. The casing will be under lock and key, so that only persons authorized to do so can obtain access to the interior thereof. It will also be observed that the liquid may be purchased by means of dropping in the coin, and that no lever or button need be manipulated by the purchaser.

Having thus described my invention, what I claim is—

1. In an apparatus for automatically vending liquids, the combination, with the casing having a slit, a spout for receiving a coin inserted in said slot, and a tank for holding liquids having a cock, of the pivoted tube open at one end and closed at the other and provided with a plate at its closed end immediately beneath the delivery end of the spout, a funnel communicating with said tube, an arm connecting said tube with the handle of the cock, and an outlet or discharge pipe at the open end of said tube, substantially as described.

2. In an apparatus for automatically vending liquids, the combination, with a casing having a slit, a coin-delivery spout, and a tank for holding liquids having a cock, of a pivoted tube open at one end and closed at the other and having a plate for receiving a coin at its closed end, a funnel on the upper side of said tube, an arm connected with said funnel and with the handle of the cock, a flexible pipe connecting the funnel and cock, and a discharge-spout at the open end of the tube, substantially as described.

3. The combination, with the casing 1, having a slit therein, a coin-delivery spout 9, a tank or vessel 2, having cock 3, provided with handle 4, of the tilting tube 6, open at one end and closed at the other, a plate 8, located at the closed end of said tube and intermediately beneath the discharge end of the coin-delivery spout, the fan-shaped funnel $6^a$, the flexible tube 5, connecting the funnel and cock, the bifurcated arm 13, connected with the handle of the cock, the arm 10, secured to the funnel and having arm 12 engaging with the bifurcated arm 13, and the discharge-spout 15, projecting through the casing and located at the open end of the tilting tube, substantially as described.

In testimony that I claim the foregoing as my own I have hereunto affixed my signature in presence of two witnesses.

JAMES D. HOUSTON.

Witnesses:
JOHN F. JEROME,
W. F. FAAS.